UNITED STATES PATENT OFFICE.

ELLIOTT R. MOFFET, JR., AND OLIVER RODNEY MOFFET, OF JOPLIN, MO.

ATTACHMENT FOR SMELTING-FURNACES.

SPECIFICATION forming part of Letters Patent No. 359,882, dated March 22, 1887.

Application filed November 11, 1886. Serial No. 218,579. (No model.)

*To all whom it may concern:*

Be it known that we, ELLIOTT R. MOFFET, Jr., and OLIVER R. MOFFET, both of Joplin, in the county of Jasper and State of Missouri, have invented a new and Improved Attachment for Smelting-Furnaces, of which the following is a full, clear, and exact description.

This invention relates to smelting-furnaces, the object of the invention being to obviate the necessity of standing in front of the fire when stirring or poking the same; and to the end named the invention consists of a series of pokers arranged to be operated from the side, and to be thrown inward and upward by the action of a shaft that is turned by a crank or other proper connection, the pokers being arranged in connection with a shovel or plunger, as will be hereinafter described, and specifically pointed out in the claims.

Reference is to be had to the accompanying drawings, forming a part of this specification, in which similar figures of reference indicate corresponding parts in both the views.

Figure 1 is a face view of our improved firetending attachment, the shovel-handle being shown in section; and Fig. 2 is a sectional elevation taken on line x x of Fig. 1, part of the handle being broken out.

In the drawings above referred to, 10 represents the body of an open-blast smelter, said smelter being provided with an apron, 11.

12 is a smoke-stack, and 13 a hopper, the lower opening of which is closed by a slide-valve, 14, that is controlled and operated by a lever, 15, said lever being pivotally connected by a bolt, 16, to the outer edge of the valve at a point near its longitudinal center, one end of the lever being pivotally connected to any proper permanent support, as is clearly shown in the drawings.

In front of the apron 11 we mount a shaft, 17, which carries one or more lever-arms, 18, to the ends of which there are pivotally connected poker rods or bars 19, the ends of said rods or bars 19 being supported by the apron 11.

Although we have shown but two of the levers 18 and two poker-bars, 19, it will of course be understood that any required number of such bars could be employed.

The shaft 17 is mounted in adjustable boxes 20, and to one end of the shaft there is secured a crank-arm, 21, having a handle, 22; or, if deemed advisable, the shaft could be provided with a proper form of gear-wheel arranged to be driven by proper connection with any source of power.

A second shaft, 23, carrying a pinion, 24, is mounted in front of the shaft 17, this shaft being also mounted in adjustable boxes, such as those shown at 25, the end of the shaft being provided with a crank-arm, 26, having a handle, 27, or a gear, as explained in connection with the shaft 17. The pinion 24 engages with a rack, 28, that is formed upon or connected to a shovel-handle, 30, which is suspended by a chain, 31, from a proper framework, 32. The under side of the shovel 33, that is carried by the handle 30, is beveled off or inclined upon each side of the handle, as shown at 34.

From the construction described it will be seen that by turning the crank-arm 21 so as to throw the levers 18 in the direction of the arrow *a* the poker-bars will be carried forward and within the furnace, entering and stirring the fire, and as the shaft 17 is turned in an opposite direction all material clinging to the bars or pokers 19 will be scraped off by the shovel 33, which, after the pokers have been withdrawn to the position in which they are shown in full lines in Fig. 1, is advanced by turning the crank 26, and, riding over the apron 11, will push forward any material which may have clung to the pokers and been deposited upon the apron 11, the shovel at 30 acting to hold the pokers to their work. After the fire has been thoroughly stirred the lever 15 is moved in the direction of the arrow *b*, thus carrying the valve 14 to a position to clear the opening at the bottom of the hopper, so as to allow a fresh charge of ore to fall into the furnace. The handle 30 is held in engagment with the pinion 24 by a roller, 40, said roller being carried by arms 41, through which the shaft 23 passes, said arms being connected to standards 42.

Having thus fully described our invention, we claim as new and desire to secure by Letters Patent—

1. The combination, with a shaft carrying lever-arms, of bars or pokers connected to said lever-arms, a second shaft, a pinion carried by (No Model.)
I. E. MOODY.
MANUFACTURE OF CUTLERY HANDLES.
No. 359,883. Patented Mar. 22, 1887.
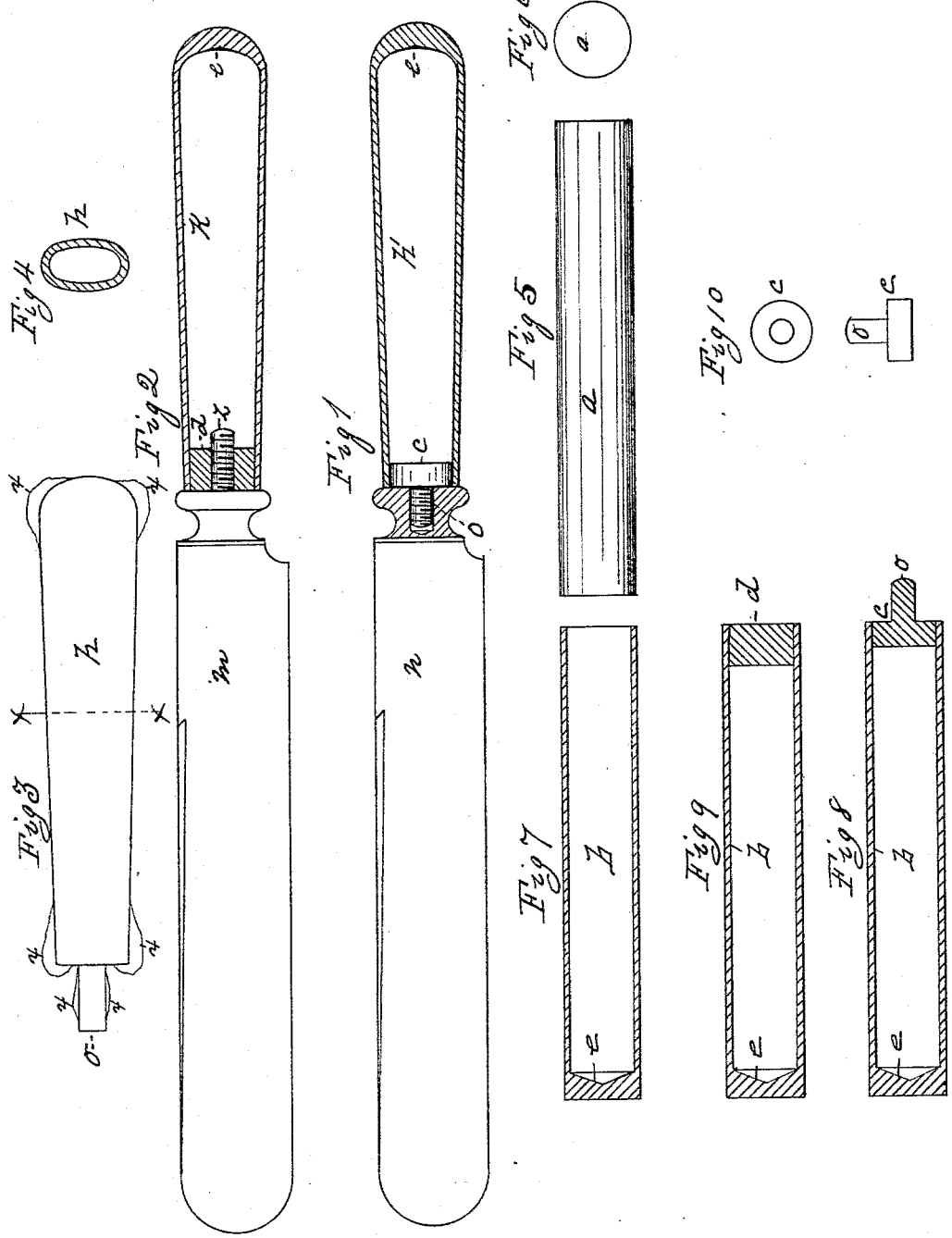
WITNESSES:
INVENTOR
Isaac E. Moody
BY
Henry A. Chapin
ATTORNEY